United States Patent
Giorgianni et al.

[11] Patent Number: 6,135,609
[45] Date of Patent: *Oct. 24, 2000

[54] CABINET FOR COMMERCIAL TELEVISION SET AND METHOD OF INSPECTION

[75] Inventors: Anthony M. Giorgianni; Dorothy M. Giorgianni, both of Bensalem, Pa.

[73] Assignee: Visual Security Concepts, Inc., Bensalem, Pa.

[*] Notice: This patent is subject to a terminal disclaimer.

[21] Appl. No.: 09/069,954

[22] Filed: Apr. 30, 1998

Related U.S. Application Data

[62] Division of application No. 08/779,442, Jan. 7, 1997, Pat. No. 5,806,970.

[51] Int. Cl.$^7$ .............................. A47B 23/06; A47B 5/00

[52] U.S. Cl. .......................... 362/133; 362/253; 362/362; 312/7.2; 348/836; 348/843

[58] Field of Search ................................. 362/253, 362, 362/367, 133, 127, 31; 312/7.2; 348/836, 843, 841

[56] References Cited

U.S. PATENT DOCUMENTS

| | | | |
|---|---|---|---|
| D. 318,663 | 7/1991 | Frisinger | D14/151 |
| 2,598,072 | 5/1952 | Rose | 178/7.5 |
| 2,732,545 | 1/1956 | Passow et al. | 340/258 |
| 2,779,938 | 1/1957 | Pifer | 340/369 |
| 2,805,324 | 9/1957 | Zedric, Jr. | 240/4 |
| 2,929,667 | 3/1960 | Jackson | 312/7 |
| 2,932,019 | 4/1960 | Pifer et al. | 340/369 |
| 3,951,910 | 4/1976 | Mark | 260/45.9 |
| 4,006,300 | 2/1977 | Boldt et al. | 358/254 |
| 4,794,234 | 12/1988 | Kinugawa et al. | 235/1 |
| 4,853,790 | 8/1989 | Dickie | 358/245 |
| 4,853,791 | 8/1989 | Ginther, Jr. | 358/247 |
| 5,237,607 | 8/1993 | Diamantis | 379/419 |

OTHER PUBLICATIONS

TV's greatest hits 70's & 80's, Tee Vee Toons, Inc., 1987.
Dec. 1997 Gift Catalog advertisement for see–through telephone cases.
1991–1992 Cook Brothers, Inc. catalog, pp. 54, 56 and 76 – advertisements for transparent TVs and telephones.
Internet information printed Dec. 2, 1998 on the "RCA TRK–12 Phantom Teleceiver 1939", exhibited at the 1939 World's Fair, was housed in a "see–through" encasement.
Internet information printed Dec. 2, 1998 on the "Television in the World of Tomorrow", exhibited at the 1939 World's Fair.
1989 B.A. Pargh Company, Inc. catalog for a clear plastic telephone.
1990 GPX (Gran Prix Electronics, Inc.) catalog which has see–through electronics.
1991 GPX (Gran Prix Electronics, Inc.) catalog which has see–through electronics.
Photographs taken Oct. 27, 1998 of an actual sample of a Model TVP45C TV which is advertised in the 1991 GPX catalog.
Photocopy of a label on the bottom face of the Model TVP45C TV sample advertised in the 1991 GPX catalog.
1990 Exhibitors Directory—Consumer Electronics Show.
1991 Exhibitors Directory—Consumer Electronics Show.

*Primary Examiner*—Thomas M. Sember
*Attorney, Agent, or Firm*—Knoble & Yoshida LLC

[57] ABSTRACT

A visionary replacement (substitute) back panel for a commercially available television cabinet is provided which permits a security inspection of the interior of the television cabinet without the removal of any cabinet walls or the opening of the cabinet members. The substitute back panel conforms to the shape, electrical and structural standards of the O.E.M. (original equipment manufacturer) back panel. optically clear viewing planes are provided. Ultraviolet (U.V.) light filtering may be incorporated. Tamper resistance attachment may be included. An auxiliary light source may also be included which is selectively activated. A method of inspection of the interior of the cabinet is easily conducted from the outside thereof.

12 Claims, 5 Drawing Sheets

CABINET FOR COMMERCIAL TELEVISION SET AND METHOD OF INSPECTION

This is a Divisional application of Ser. No 08/779,442, filed Jan. 7, 1997, now U.S. Pat. No. 5,806,970.

BACKGROUND OF THE INVENTION

The present invention is directed to an enhanced security level television cabinet for correctional institutions. Specifically it is directed to a visionary, i.e., visual inspection or transparent, replacement back panel for the cabinet of a commercially available television set which will readily facilitate a visual inspection of the interior of the cabinet, at any time, without the opening of the cabinet.

Most inmates in correctional institutions, and the secured hospital facilities connected therewith, are permitted television sets. Often times these sets are small portable models which are capable of easily being carried from location to location.

All previous television sets had opaque cabinet walls, including opaque back panels. Such a television set enclosure offers an closed container, in which contraband and home-made weapons may be concealed. It becomes time consuming and labor intensive for correctional institution guards to repeatedly open and inspect the interiors of inmates television cabinets.

Decorative telephones have been made with clear plastic cases. These have been provided for both dial tone and touch tone telephones. However, these clear plastic cases have been impractical for use as television set cabinets.

With residential telephones, unlike television sets, there is no danger of electrical discharge or spark. Telephones operate at 6 volts, while the electrical voltage found in television sets can exceed 10,000 volts.

An object of the present invention is to provide a modification to a standard television cabinet with will freely permit a security inspection of the interior of the cabinet without opening the cabinet or removing any of its walls.

A further object of the present invention is to provide such modification while maintaining the O.E.M (original equipment manufacturer) structural and electrical dielectric standards for the television cabinet.

An additional object is to provide U.V. (ultraviolet) protection for the inspector of said cabinet.

An even further object is to provide auxiliary illumination (lighting) when the security inspection is carried out in a dimly lighted environment.

SUMMARY OF THE INVENTION

The objects of the present invention are realized in a replacement back panel for a commercially available television set cabinet. This replacement back panel is a visionary substitute back panel for the O.E.M. back panel of the television cabinet. The visionary substitute back panel includes transparent viewing panes sufficient in size and placement to enable a security inspection of the entire interior of the television cabinet, without opening it.

The visionary substitute back panel maintains the structural integrity of the cabinet and meets O.E.M. standards for strength, flame retardant and dielectric strength (electrical insulation) requirements.

A U.V. blocker is added to all visionary (transparent and optically transmitting) surfaces.

The previously existing television cabinet chassis threaded mounting holes are utilized. However, tamper resistant attachment screws are incorporated to hold the visionary substitute back panel to the chassis.

Auxiliary illumination may be carried on the interior surfaces of the visionary back panel and focused to illuminate the interior of the television cabinet. As an alternative, one or more lenses may be incorporated into the walls of the visionary back panel. An independent light source may be held against a lens to illuminate the interior of the television cabinet.

An inspection process is conducted through the walls of the visionary replacement/substitute back panel in the presence of sufficient ambient lighting, or with the aid of auxiliary illumination and light distribution as desired.

DESCRIPTION OF THE DRAWING

The features, advantages and operation of the television set cabinet, visionary, back panel, of the present invention, will become readily apparent and further understood from a reading of the following detailed description with the accompanying drawings, in which like numerals refer to like elements, and in which.

DETAILED DESCRIPTION OF THE INVENTION

The present invention is security facilitating back panel for a commercial television set cabinet, and an inspection method made possible because of modifications to this television cabinet created with the replacement of the O.E.M. back panel with a visionary-type substitute back panel. The invention also includes a process of visual inspection of the interior of the television cabinet through transparent portions (viewing planes) in the visionary back panel, and auxiliary illumination and light distribution as selected.

Figure 1:
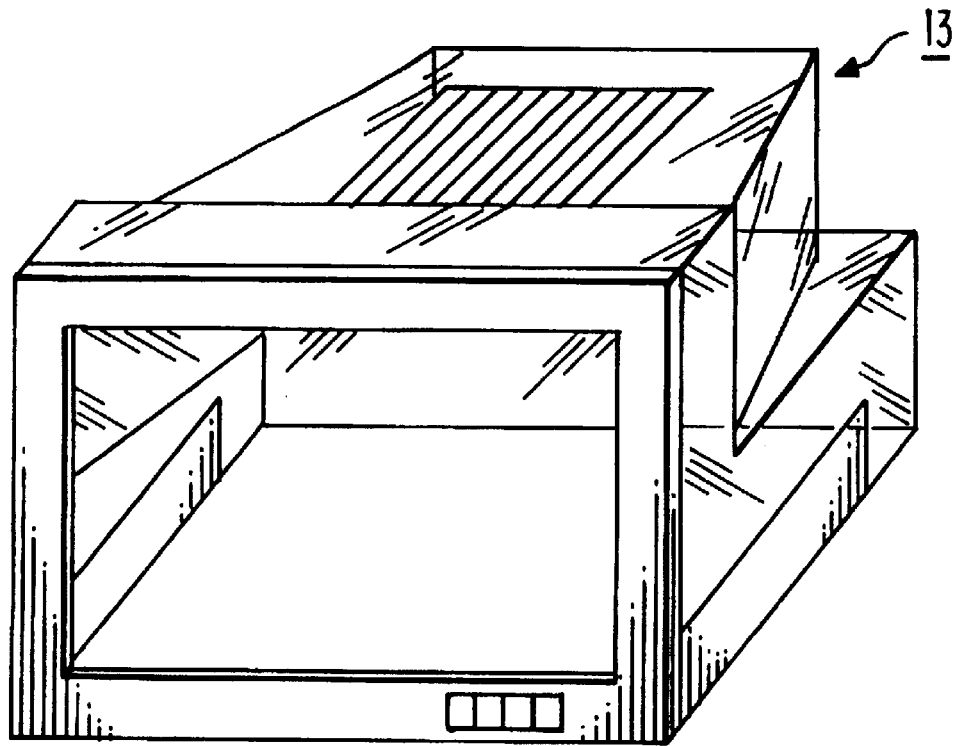
FIG. 1 is a perspective view of a commercially available television set cabinet with the replacement visionary back panel invention installed.

A commercial television cabinet 11, FIG. 1, is modified by the replacement of its O.E.M. back panel with a visionary back panel 13, which meets the O.E.M. standards for strength, fire retardant and dielectric strength requirements. The material(s) from which the visionary back panel 13 is made provides a structure which meets Underwriters Laboratory standard—UL 1410, for television receivers and high voltage products. Specifically, the back panel 13 is a single molded structure made of a single or composite material, such as a thermoplastic polymer, with a thickness in the range of about 1/16 inches to about 5/32 inches, and a nominal thickness of 3/32 inches.

Figure 2:
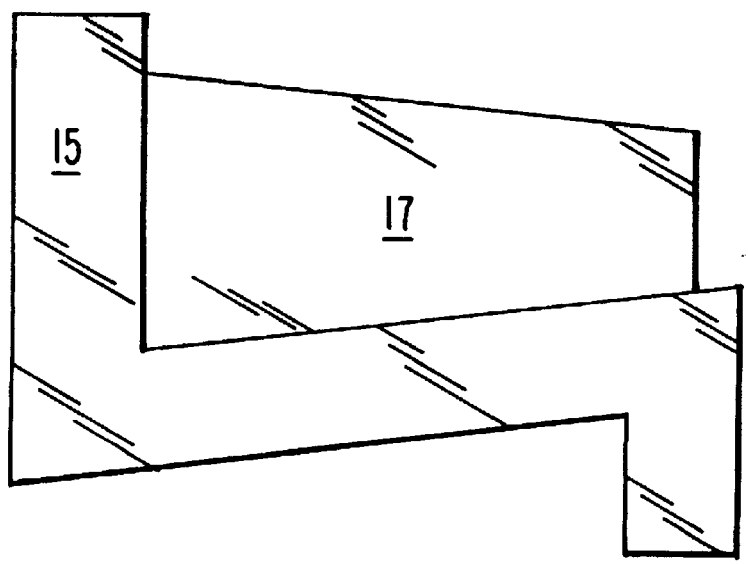
FIG. 2 is a right side elevation of the replacement visionary back panel invention, the left side elevation being a mirror image, thereof.

The back panel 13, has a plurality of planer surfaces, each such planer surface creates an individual transparent planer viewing plane 15, 17, FIG. 2, as shown in the side view of the back panel 13. Additional planer surfaces create the viewing planes 19, 21, 23, 25, 27, 29 shown in FIGS. 3–4, the exterior rear view and top view of the back panel 13, respectively.

While the back panel 13 may be molded from a composite of contiguous materials, it is preferred that it be molded from a single thermoplastic sheet material which is essentially transparent, i.e. having a light (visual) transmission index of about 90 percent or more. Where a composite back panel 13 is used, it is preferred that about 70 percent or more of each planer surface be transparent.

Figure 4:
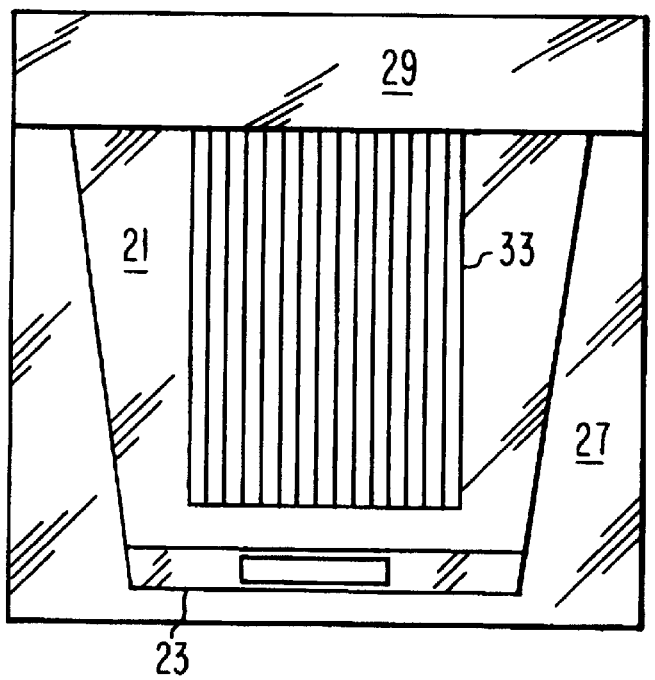
FIG. 4 is a top plan view of the replacement visionary back panel invention showing the exteriors surface thereof.
Figure 3:
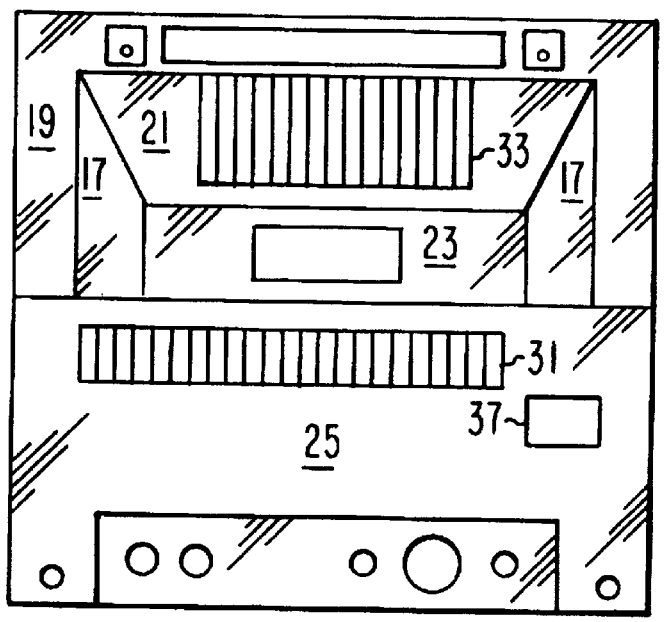
FIG. 3 is a rear view elevation of the replacement visionary back panel invention, showing the exterior surface thereof.
Figure 5:
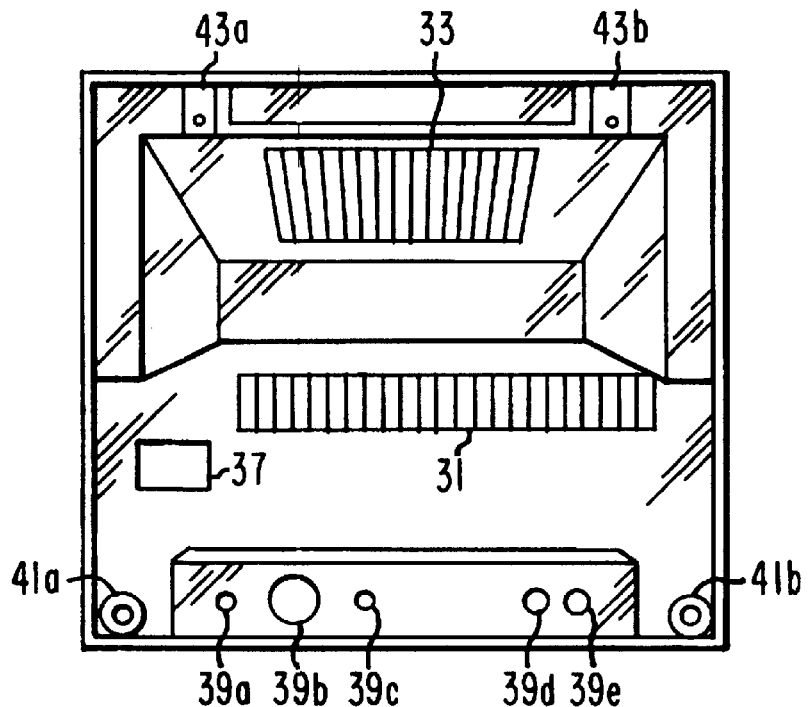
FIG. 5 is an interior elevation view of the replacement visionary back panel invention showing the interior surfaces thereof.
Figure 6:
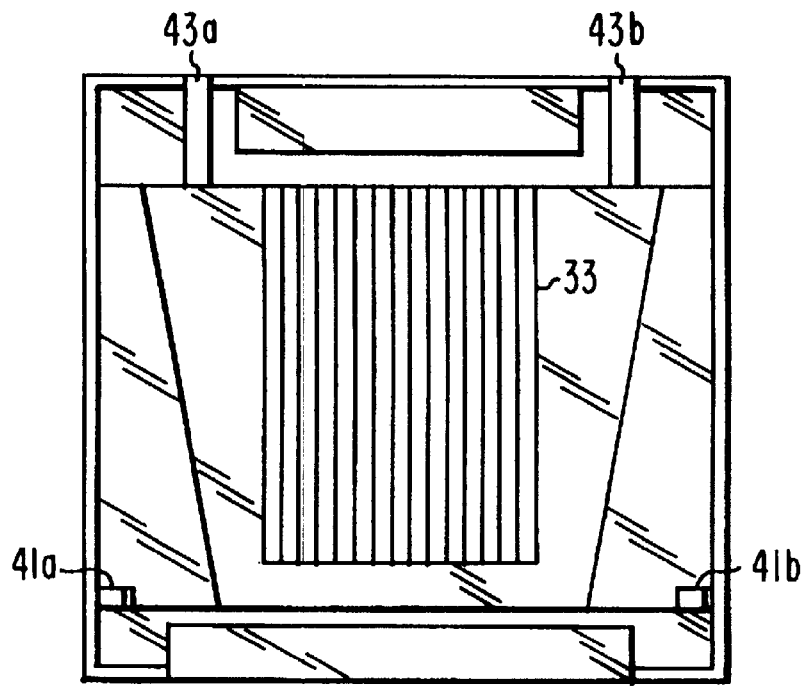
FIG. 6 is a bottom view of the replacement visionary back panel invention showing the interior surfaces thereof.

The preferred back panel 13 structure is shown in FIGS. 2–6, where FIGS. 5 and 6 show a view of the interior of the back panel 13, of the opposite faces shown in FIGS. 3 and 4, respectively. These figures, FIGS. 2–6, show that the physical components of a O.E.M. back panel are also present in the visionary back panel 13. These components include the back air passage grill 31 and top air passage grill 33, a handle/grasp cavity 35, power cord opening 37, adjustment knob openings 39a–39e, and chassis attachment anchor posts 41a,b and 43a,b.

These components 31 through 43b are molded of the same transparent thermoplastic material as the panels comprising the viewing panes 17–29.

The thermoplastic resin from which the back panel 13 is molded has mixed into it (i.e., "doped" with) a U.V. blocker, of the type available in the industry. This U.V. blocker will block any harmful, spark emission "flashes" which might occur from the television chassis. The U.V. blocker will also act as a yellowing inhibitor when the back panel is made from polystyrene, which has excellent light transmission as a transparent material, is known to be an excellent electrical insulator, has a very high (800 F) combustion temperature, and good tensile strength.

LEXAN (General Electric brand), which is a bisphenolated polycarbonate, acrylic resin, is ozone resistant, non-yellowing, self-extinguishing and has a high impact strength, is also a material from which the back panel can be molded. LEXAN brand polycarbonate, as with other polycarbonate materials, has a transparency in excess of 90 percent and high dielectric strength.

ABS (acrylonitrile butadiene styrene) and LUCITE (E.I. Du Pont) brand acrylic resin may also be used for the material from which the back panel is molded. The transparency of ABS and LUCITE brand acrylic is not as high as the polycarbonate materials discussed above. Moreover, they tend to turn white when mechanically or thermally worked. This tendency yields a less transparent or more translucent finished material. However, certain strength and durability characteristics of these latter materials exceeds that of the previously discussed polycarbonate-type materials.

The replacement visionary back panel 13, being made of transparent material, and having a high percentage of its surface area comprised of planer surfaces (flat viewing panes), permits a a ready and reliable visual inspection of the interior of the television cabinet and its chassis cavities, when viewed in the presence sufficient ambient light, such as normal daylight or office work place standards for lighting.

Tamper resistant or tamper proof attachment screws are use to the television cabinet chassis mounting areas.

A plurality of different luminary modifications can be made to the back panel 13 invention. These are shown in FIGS. 7–12, and will be discussed below as three alternate embodiments.

Figure 7:
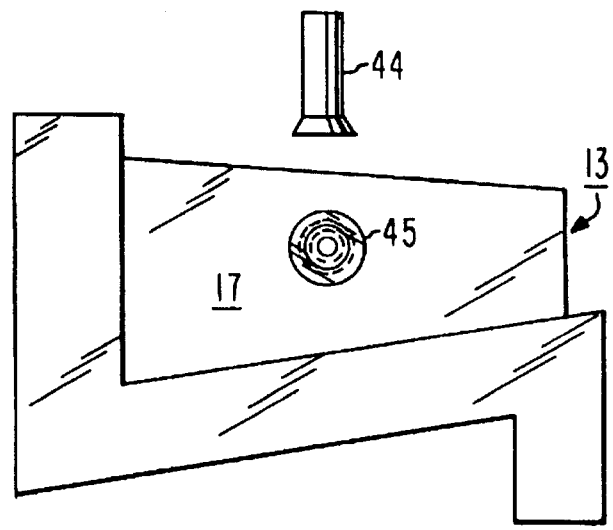
FIG. 7 shows a side elevation of a first alternate embodiment of the invention showing the addition of a lens structure to the side wall of FIG. 2.

Any of the transparent planer surfaces can carry a lens 45, FIG. 7. Such lenses 45 are each round and act to gather light from outside the back panel 13, as with planer face panel 17, and diffuse it into the cabinet 11 interior. When a flashlight 44 light beam is focussed against the outer face of the lens 45, the lens 45 and flashlight combination acts as a flood light, thereby illuminating a large area of the cabinet's interior.

By incorporating such lenses 45 into the walls of the back panel 13, strong ambient light will also be gathered and the light transmission into the interior of the cabinet 11 should thereby be increased.

Figure 8:
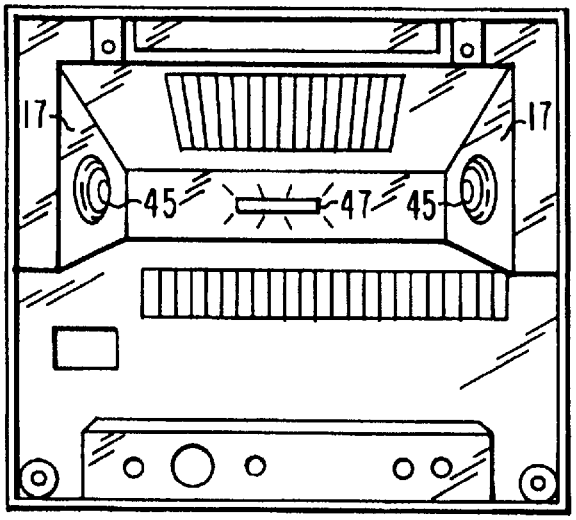
FIG. 8 shows an interior elevation view of the first alternate embodiment of the invention showing the added lens structures in the side walls of the visionary back panel, and a second alternate embodiment, this being an interior light on the back wall of the visionary panel.
Figure 9:
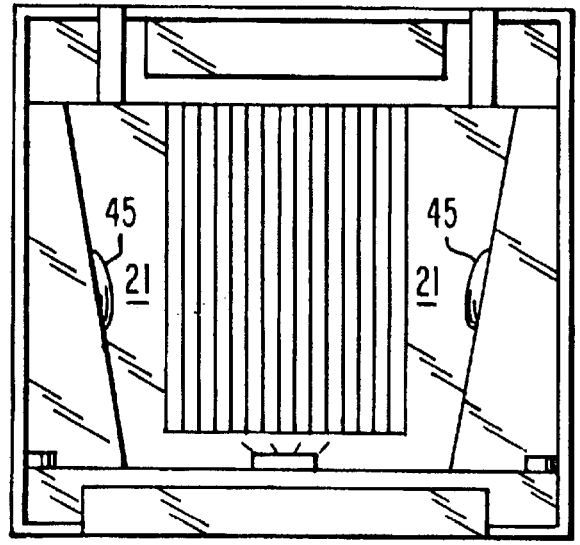
FIG. 9 shows a bottom interior view of the first and second alternate embodiments.

The individual lens 45 can be molded into specific back panel 11 walls 17, 21, FIGS. 7–9; and focussed on different regions of the cabinet 11 interior. When cumulatively considered, these various lens 45 focus areas should cover all views of the interior of the cabinet 11.

A light source 47, such as a light emitting diode (LED) or a incandescent or KRYPTON-type bulb, i.e., a DC light source, can be mounted to an inside wall of the back panel 13, FIG. 8 in a usual manner, with a lens covering of conventional design. It is advisable to place this light 47 at a location where light transmission from outside the cabinet 11 is somewhat impaired, such as immediately behind the CRT (cathode ray tube) "gun" electrical connector at the end of the tube. This location is shown in FIG. 8. Power for this light 47 is temporarily obtained through cabling or wiring passing to the exterior face of the back panel 11. By pressing a 3, 6 or 9 volt DC pen light-style, battery pack 49 (depending upon light bulb selected) against the terminus of the cabling, the light 47 can be powered to illuminate the rear of the cabinet 11.

Figure 11:
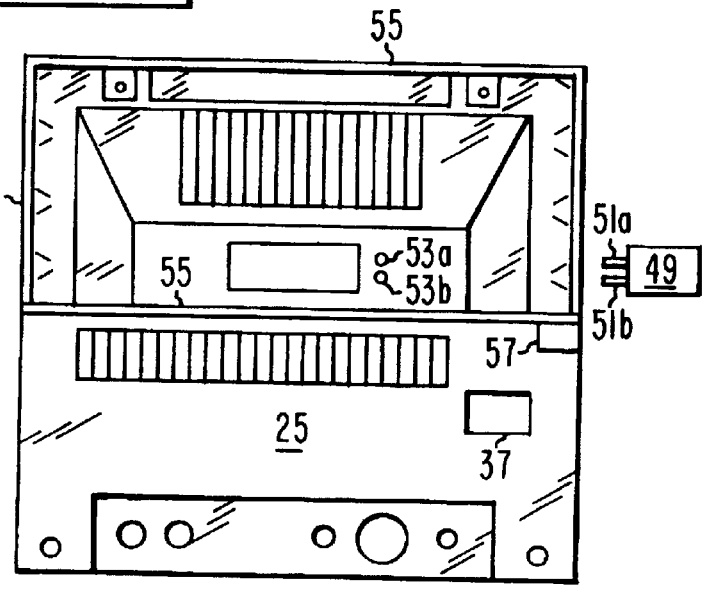
FIG. 11 shows an exterior back elevation view of the third alternate embodiment, fiber optic illuminator.

The battery pack 49, FIG. 11, has a pair of probes 51a,b which can contact against the terminus. This terminus is the contact pads 53a,b FIG. 11, on the exterior face of the back panel 11. The probes 51a,b and the contact pads 53a,b can be color coded or shape-coded to determine polarity, if necessary. Shape coding can include having one probe 51a and one pad 53a being larger than the respective other, or being square or angled-key shaped.

Figure 10:
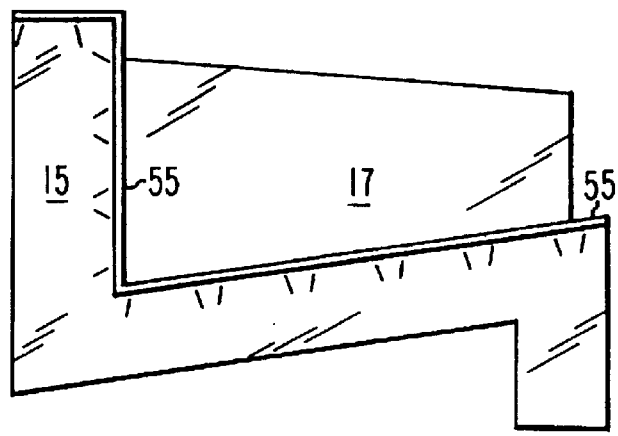
FIG. 10 shows a third alternate embodiment, being an elongate fiber optic illumination strip added to the visionary back panel invention, this figure being a right side elevation view of the invention.
Figure 12:
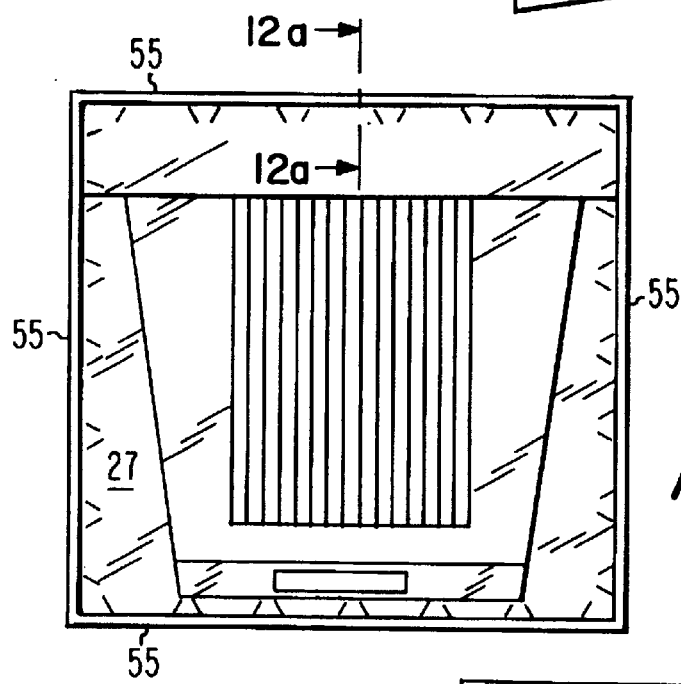
FIG. 12 shows a top plan view showing the third embodiment, fiber optic illuminator
Figure 12A:
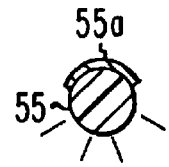
FIG. 12a shows a cross-section of the fiber optic illuminator taken as shown in FIG. 12.

As an alternative to the lens 45 system and the interior light 47, or in addition thereto, a fiber optic (or light rod) lighting system, comprising the illumination strip (or light rod) 55 can be mounted to various inside surfaces of the back panel 13. FIGS. 10–12 show this fiber optic light rod 55 mounted to the interior face of the back panel 11 at the mating corners of various planer panels. These are planer panels/panes 15 to 17, and, 25 to 27; and also along the outer edge of the panel/pane 15 where it joins the picture tube face region of the cabinet 11 chassis. The fiber optic light rod 55 can be illuminated from a light source connected to the junction connector 57 is mounted to the outside face of the back panel 13 adjacent to the power cord opening 37, FIG. 11, and is in contact with the fiber optic strip/rod 55. A face or side of the fiber optic strip/rod 55 may carry a reflective coating 55a, FIG. 12a, to focus the light emanating from the strip/rod 55 into the interior of the cabinet 11.

A portable light source, available in the market, can be selectively connected to the connector 57, to power the fiber optics rod 55 and increase the illumination within the cabinet 11.

Each of these above-discussed illumination alternatives are useful in low ambient light conditions, or in situations where suspicious shapes are viewed within a cabinet 11 and more light is need for identification.

Many changes can be made in the above-described invention without departing from the intent and scope thereof. It is thereby intended that the above description be read in the illustrative sense and not in the limiting sense.

What is claimed is:

1. A method of reducing a potential for contraband in a security environment, comprising steps of:
    (a) maintaining a controlled area in which contraband is not permitted;
    (b) providing a television set within the controlled area, the television set having a housing that defines an interior space, the housing comprising at least one transparent viewing pane that permits inspection of at least a portion of the interior space in which contraband could be hidden; and
    (c) periodically inspecting for contraband the portion of the interior space in which contraband could be hidden by having a guard view the interior space through the viewing pane.

2. A method according to claim 1, wherein the security environment comprises a correctional institution.

3. A method according to claim 1, wherein step (c) further comprises a step of ensuring that sufficient light is incident on the portion of the interior space in which contraband could be hidden to permit said step of periodic inspecting.

4. A method according to claim 1, wherein step (b) is performed with a viewing pane that has at least 90% transmission transparency.

5. A method according to claim 1, wherein step (b) is performed with a housing that comprises a plurality of transparent viewing panes, said viewing panes providing different angles of view into the interior space.

6. A method according to claim 5, wherein step (c) comprises inspecting at least a portion of the interior space in which contraband could be hidden by viewing the interior space through more than one of said viewing panes.

7. A method according to claim 6, wherein step (c) is performed by viewing the entire interior of the housing.

8. A method according to claim 1, wherein step (b) is performed with a viewing pane that contains a UV blocker.

9. A method of making a television unit that is designed so as to provide viewability to spaces therein in which contraband may be hidden, comprising steps of:
    (a) providing a television unit that is designed to have an opaque housing mounted thereon;
    (b) mounting a security housing on the unit that is designed to facilitate visual security inspection of the interior of the unit, the security housing comprising at least one transparent viewing pane that permits inspection of at least a portion of the interior space in which contraband could be hidden; and
    (c) providing the unit to a security environment.

10. A method according to claim 9, further comprising a step, performed in no particular order with respect to other steps, of advising a security institution how to use the unit to reduce the potential for contraband.

11. A method according to claim 9, wherein the security environment comprises a correctional institution.

12. A method according to claim 9, wherein step (b) comprises securing the security housing to the unit with at least one tamper-resistant fastener.

* * * * *